US009690851B2

(12) United States Patent
Nauze et al.

(10) Patent No.: US 9,690,851 B2
(45) Date of Patent: Jun. 27, 2017

(54) AUTOMATIC GENERATION OF CONTEXTUAL SEARCH STRING SYNONYMS

(71) Applicant: ORACLE INTERNATIONAL CORPORATION, Redwood Shores, CA (US)

(72) Inventors: Fabrice Nauze, Amsterdam (NL); Christian Kissig, Amsterdam (NL); Geert Kloosterman, Amstelveen (NL); Jorge Lasheras, Amsterdam (NL); Albert Derk Eduard Vedelaar, Sliedrecht (NL); Sergiu Nisioi, Bucharest (RO); Madalina Zarafin, Bucharest (RO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 274 days.

(21) Appl. No.: 14/548,553

(22) Filed: Nov. 20, 2014

(65) Prior Publication Data

US 2016/0147775 A1    May 26, 2016

(51) Int. Cl.
G06F 17/00    (2006.01)
G06F 17/30    (2006.01)
G06F 17/27    (2006.01)

(52) U.S. Cl.
CPC ...... *G06F 17/3071* (2013.01); *G06F 17/2785* (2013.01); *G06F 17/30616* (2013.01); *G06F 17/30654* (2013.01); *G06F 17/30684* (2013.01); *G06F 17/30867* (2013.01); *G06F 17/30985* (2013.01)

(58) Field of Classification Search
CPC .... G06F 17/30; G06F 17/00; G06F 17/30616; G06F 17/30654; G06F 17/30684
USPC .................................................. 707/600–899
See application file for complete search history.

(56) References Cited

U.S. PATENT DOCUMENTS

| 8,335,791 | B1 | 12/2012 | Goldstein et al. |
| 2007/0022115 | A1 | 1/2007 | Warburton et al. |
| 2009/0193008 | A1 | 7/2009 | De et al. |
| 2011/0184946 | A1 | 7/2011 | Hennum et al. |

(Continued)

FOREIGN PATENT DOCUMENTS

| WO | 2009/087138 A1 | 7/2009 |
| WO | 2016081170 | 5/2016 |

OTHER PUBLICATIONS

International Application No. PCT/US2015/057692, International Search Report and Written Opinion mailed on Feb. 15, 2016, 11 pages.

*Primary Examiner* — Isaac M Woo
(74) *Attorney, Agent, or Firm* — Kilpatrick Townsend & Stockton LLP

(57) ABSTRACT

Searches for content may be improved with unique reserved phrases. Reserved phrases may direct queries to specific preselected section of content. Synonyms may be generated and associated with a reserved phrase such that even when queries do not include reserved phrases, the synonyms may be used to map queries to the reserved phrases and the associated content. Synonyms may be generated and filtered such that a synonym is only associated with one reserved phrase thereby reducing search ambiguity.

15 Claims, 8 Drawing Sheets

(56) References Cited

U.S. PATENT DOCUMENTS

2014/0195348 A1* 7/2014 Sun .................... G06Q 30/0256
705/14.54

* cited by examiner

AUTOMATIC GENERATION OF CONTEXTUAL SEARCH STRING SYNONYMS

BACKGROUND OF THE INVENTION

Embodiments of the present invention relate generally to methods and systems for providing more relevant and useful content to a user in response to a query and more particularly to using unique reserved phrases to provide results to user in response to a query.

Web or enterprise searches performed by a user often return unrelated results to the intended target of the search. Users searching for technical help for a product, for example, may be presented with results for unrelated products or offers for sale of a new version of the product. In many cases, web or enterprise searches may return no results when a user does not enter the full name of a product or other search term. Hence, there is a need for improved methods and systems for that provide more relevant and useful content to a user.

BRIEF SUMMARY OF THE INVENTION

Embodiments of the invention provide systems and methods for providing more relevant and useful content to a user in response to a query. According to one embodiment, searches for content may be improved with unique reserved phrases. Reserved phrases may direct queries to specific preselected section of content. Synonyms may be generated and associated with a reserved phrase such that even when queries do not include reserved phrases, the synonyms may be used to map queries to the reserved phrases and the associated content. Synonyms may be generated and filtered such that a synonym is only associated with one reserved phrase thereby reducing search ambiguity According to one embodiment, search string expansion can comprise receiving a list of reserved phrases. Each reserved phrase in the list can be related to content and each string can be associated with a portion of the content. Each reserved phrase can be categorized according to linguistic characteristics. For example, linguistic characteristics include at least one of a noun, a verb, or a place.

A candidate list of synonyms can be generated for each reserved phrase in the list. The candidate list of synonyms can be filtered by removing synonym duplicates, comparing synonyms to a synonym rule, and removing synonym that do match the synonym rule. Each synonym can be categorized according to linguistic characteristics of the associated reserved word. According to one embodiment, generating a candidate list of synonyms can comprise generating a list of substring variations of each of the reserved phrases. Additionally or alternatively generating a candidate list of synonyms can comprises analyzing the content and determining alternate words used to refer to each of the reserved phrases in the content.

Once a query string is received, a matching synonym from the filtered list of candidate synonyms that matches a part of the query string can be identified. A determination can be made as to whether the part of the query string matches the linguistic characteristics of the matching synonym. The portion of the content associated with the reserved phrase of the matching synonym can then be transmitted.

DETAILED DESCRIPTION OF THE INVENTION

Figure 1:
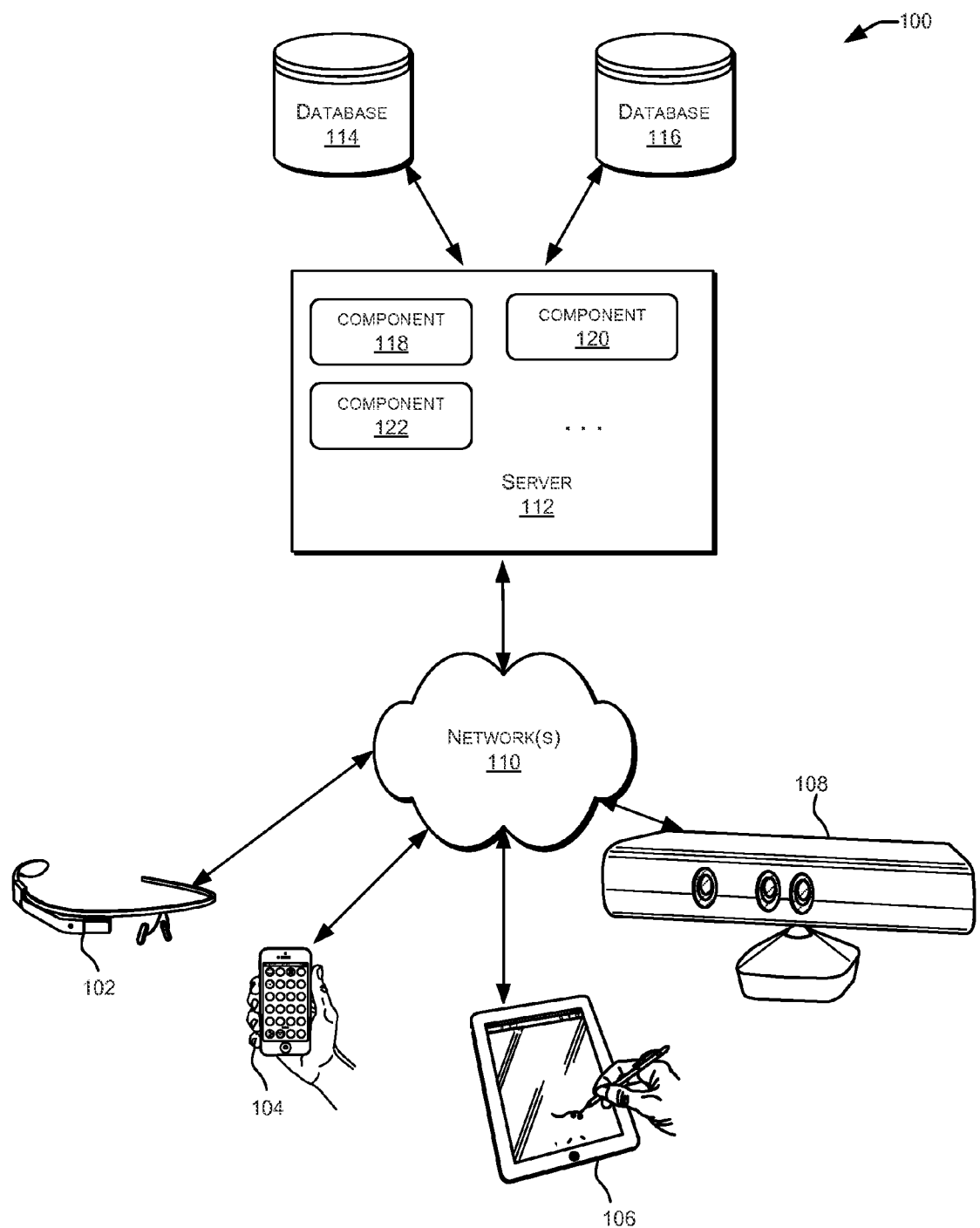
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Websites, internet portals, intranets, and the like may have a search capability allowing a user to enter a query. Queries which may include questions related to products, product names, or other query terms may be processed and compared to existing content to provide to the user information or links to information relevant to the query.

For example, a search functionality may be included on a website of a computer product manufacturer. The search functionality may be a text input box allowing the user to enter query terms. The query terms may include questions about a product of the manufacturer, requests for more information about a technical issue related to a product, and the like. Queries may be processed to return to the user links to content or content from the website relevant to the query terms.

In some embodiments, query terms may be compared to words or text in a website or in a content management system. Parts of the content that matches words of the query may be returned by the query. The search system may have different methods for matching search terms with content text based on the desired precision of search results. In some cases linguistic analysis of the content as well as query may be used to improve the precision of the results.

In some cases direct matching of query terms and content may be used. In some cases only the exact terms entered by a user are matched with content text. The search system may only return results that exactly match the query terms. Although direct matching may provide good precision, it may be inadequate for many applications. Users may enter full sentences or questions embedding words or phrases that are used in the content. Users may enter variations of words that are used in the content. Due to small variations of words, user may be presented with no results. For example, a manufacturer's website may include information about the manufacturer's products. The official names of the products on the website may include names such as "Computec X 1000" and "Computec V", for example. A user which may enter a query with the term "Where can I buy the ComputecX" may not receive any results.

In some other cases substring searches may be used. In some cases variations or substrings of the entered query terms may be matched to substrings of content text. Substring searches may provide less precision and may return more results. In many cases substring searches may return irrelevant results. Continuing with the example above, if a user enters the query with the term "Computec 1000", the system may try to match content with substrings "Computec" and "1000" which may match strings for both products "Computec X 1000" and "Computec V."

A search system taking input from a user should balance precision of returned results with the number of returned results. Direct search term mapping, may result in too few query results and may miss common variations while substring searches may results in too many results that are directed to unrelated products or concepts.

A search system is presented that provides a balance between precision and number of irrelevant results. In embodiments, a search system receive a list of reserved phrases, such as product names, that may be associated with specific parts of content. The search system may generate a list of synonyms for each word in the list of reserved phrases relevant to the content. The synonyms for each reserved phrase may be compared against one another to remove any duplicates. After duplicates are removed each reserved keyword will be associated with unique synonyms. The synonyms may be matched in context with user entered query text. Matching query text may be converted to the associated reserved phrase of each matched synonym and the content related to the reserved phrase may be returned to the user.

A system may receive a list of reserved phrases. The list of reserved phrases may be a list of important terms, products, places, and the like that are relevant to a website or other search content. The list of reserved phrases may correspond to products listed on a manufacturer's website, for example. The list of reserved phrases may be manually determined by a user. In some embodiments the list of reserved phrases may be automatically determined by scanning the website or other content. The list of reserved phrases may be identified by determining frequency of words in the content. Words that are not common words but also have a high frequency of appearance in the content may be selected as the reserved phrases.

The list of reserved phrases may include words that are found in the content. The list of reserved phrases may correspond to specific part or parts of the content. For example, for a website of a computer product manufacturer, a list of reserved phrases may include product names. The website of the manufacturer may include webpages, documents, and the like for each product and may be associated with each product name.

The list of reserved phrases may be processed to identify possible alternative terms or synonyms that may be associated with each reserved word. Each reserved phrase may be associated with additional synonyms. For each reserved word, synonyms may be identified and associated with the reserved phrases manually by a user and/or automatically by the system. Users may enter or provide a list commonly used or alternative words used for each reserved word.

In some embodiments, the system may automatically generate substring variations for each of the reserved phrases. In some cases all possible substrings longer than two or three letters of each reserved phrase may be used as synonyms and associated with the reserved word. In some embodiments additional rules for generating substring synonyms may be defined. For example, in some cases, substrings that remove numbers from the reserved phrases may generated. In the case of product names users may find it difficult to remember numbers and may only refer to products by their first words or first numbers. The reserved product name "Computec X 1000", for example, may be processed to generate synonyms after tokenization such as "Computec X", "Computec", and "Computec 1000".

Many different rules and methods for defining synonyms based on substrings of reserved phrases may be used and may depend on the context, application, and other settings.

In some embodiments, the system may scan other internal or external content to determine alternate words associated with the reserved phrases. Additional websites, for example, such as blogs, review sites, online forums, and the like may be scanned and analyzed to determine alternative words used or associated with the reserved phrases.

In some embodiments, the reserved phrases may be annotated with a part of speech or other category. An identifier may be associated with each reserved phrase that may indicate if the reserved phrase is a noun, a product, a place, a verb, and the like. Synonyms identified for each reserved phrase may inherit the designated part of speech or other category of the reserved word.

In embodiments, the lists of synonyms associated with each reserved phrase may be compared or analyzed to remove duplicates. Synonyms that were found to be associated with more than one reserved phrase may be removed such that each synonym is associated with only one reserved word. Duplicates may be removed by a variety of search and matching algorithms.

The list of reserved phrases may be categorized into different parts of speech or other groupings. Some reserved phrases, for example, may be categorized as nouns while others as verbs. In some embodiments duplicates of synonyms may be left intact if the duplicates of synonyms are associated with reserved phrases from different groups. For example, the reserved phrase "bicycling" may have a synonym "bike". Another reserved word, "bicycle" may have the same synonym "bike". Since bicycling is a verb and bicycle is a noun the two synonyms "bike" may be left intact in the synonym list of each reserved word.

In yet another embodiment, when synonym duplicates are identified, the synonyms may be removed all together in order to avoid ambiguity causing recall issues. In some embodiments all but one copy of the synonyms may be removed such that only one reserved phrase is associated with the synonym. In one embodiment the duplicate synonym that is associated with the highest ranked reserved phrase may be left intact and all others removed. Reserved phrases may be ranked based on one or more factors such as, for example, number of times they appear in the content. The more frequent the reserved phrase the higher rank of the reserved phrase may be. In some embodiments the duplicate synonyms may be compared to their associated reserved phrases. The likeness of the synonyms to the reserved phrases may be calculated based on edit distance, or other measures. In one embodiment the edit distance can be applied per character, in another embodiment it can applied per token.

Lists of synonyms may be processed by additional word filters that may remove more synonyms. Word filters may remove synonyms that are less than 2 or three characters for example. Word filters may include filter dictionaries or lists of words for filtering. Filter dictionaries may include offensive words, competitor product names, and the like.

The list of reserved phrases and the lists of synonyms may be used to process a query request from a user. When a user submits a query string the string may be analyzed to determine if one or more reserved phrases or synonyms match parts of the query. In some embodiments, matching between the synonyms, reserved phrases, and the query string may include analyzing and matching the part of speech or other linguistic characteristics. Words of the query string may be analyzed to determine their context and identify if words are used as nouns, verbs, places, or the like. The words in the query string may be matched to synonyms and/or reserved phrases only if the parts of speech and other grouping match. The words in the query string that do not match the reserved phrases or the synonyms can also be used by the search system. That is, the queries can be complex and may contain more information than just reserved phrases and this information can also be relevant to obtaining good search results.

If part of the query string matches one of the reserved phrases then a search may be performed on the content that includes the matching reserved word. If part of the query string matches one of the synonyms then a search may be performed on the content that includes the associated reserved phrase. In some cases each reserved phrase may be indexed or mapped together with some topic to specific parts of the content. When a user enters a query string that includes the reserved phrase or one of its synonyms the indexed content or links to the content may be presented to the user when the query matches the topic. If a user enters the query term "my Computec X 1000 is broken" the topic is a about something being broken, the matched product is "Computec X 1000", the user can be presented with content about what to do with a broken "Computec X 1000".

In embodiments the list of synonyms for each reserved phrase may be continuously and/or periodically updated. As new reserved phrases are added or removed from the list of reserved phrases the list of synonyms for each reserved phrase may be recomputed. When a new reserved phrase is added, synonyms for the new reserved phrase may be determined and compared to the existing lists of words to remove duplicate synonyms. When a reserved phrase is removed from the list synonyms that might have previously been duplicated, may be added to the list of synonyms of some of the remaining reserved phrases.

In some embodiments, words in a user's query string may be recorded. The words in the query string that did not match any terms in the content or did not return results to a user may be recorded and saved. The system may monitor how many times a particular word, which did not return results, was entered by a user. The list of unmatched words and their frequency may be provided to an administrator for consideration. The operator may select one or more of the unmatched words and add them to a list of synonyms of a reserved word. In some embodiments, when a particular word in user's query string is unmatched more than a predetermined threshold, an administrator alert may be triggered. In some cases, when a word is unmatched more than 5 or 10 times may results in an administrator notification such as an email or an alert. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
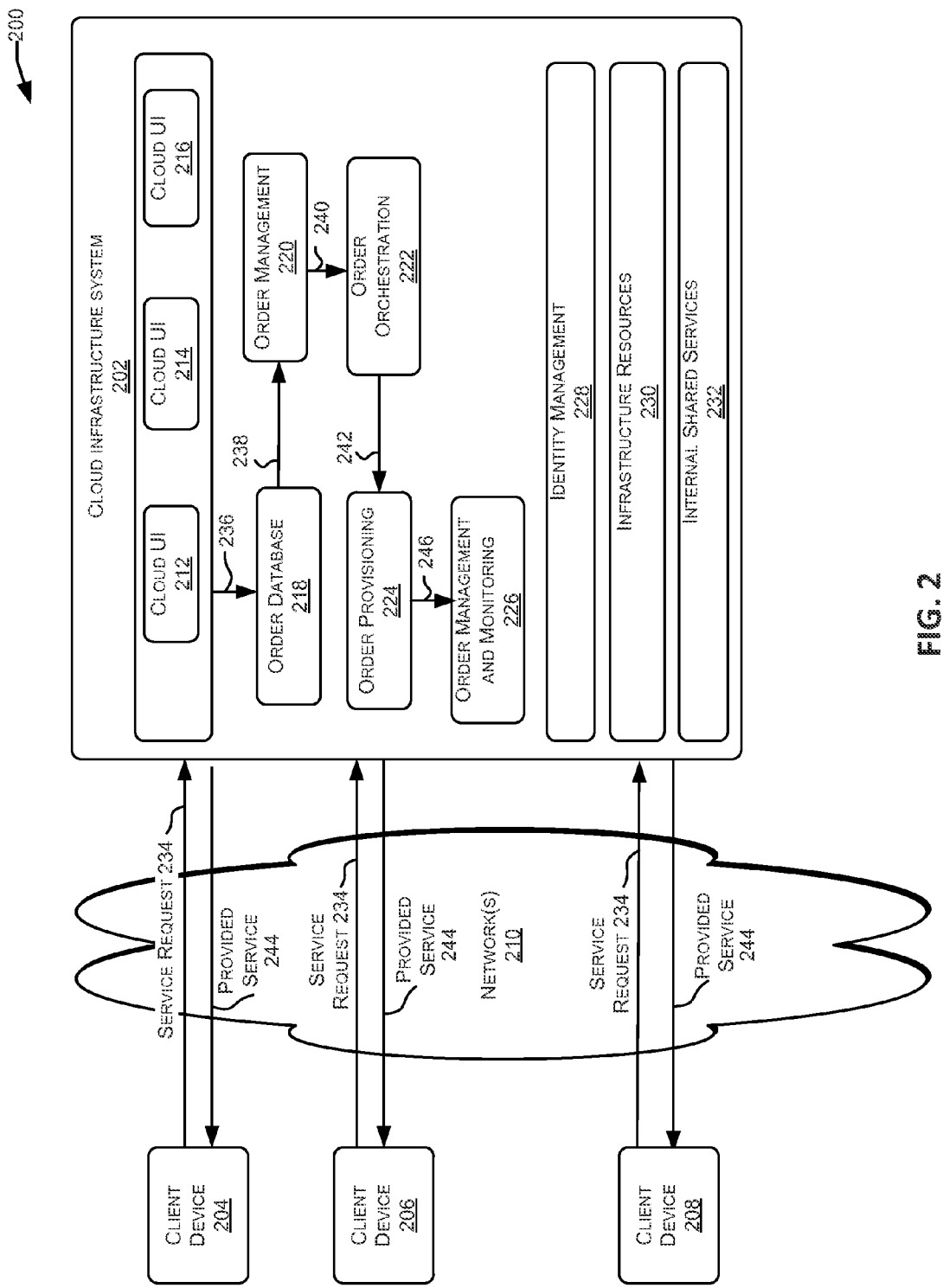
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
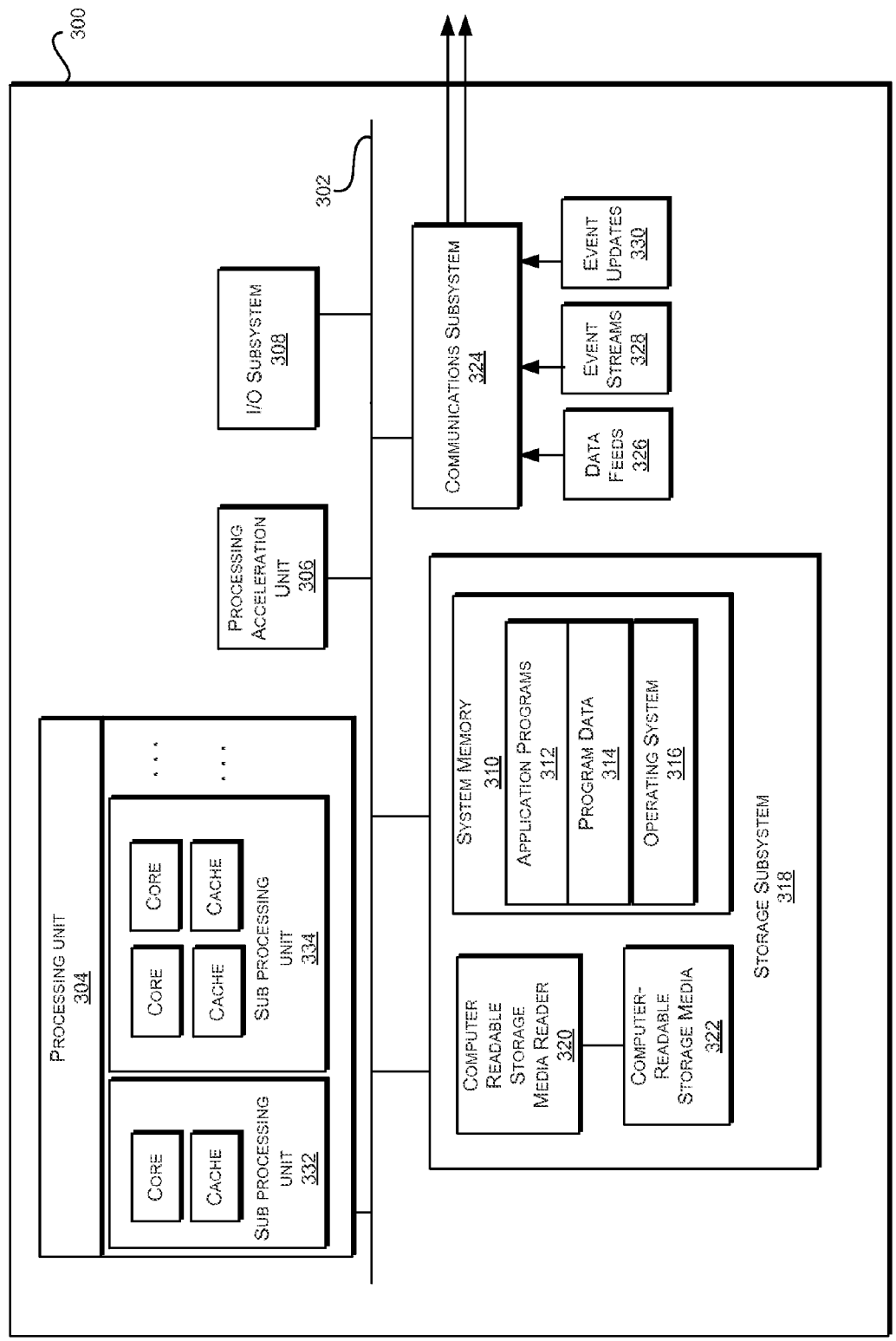
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
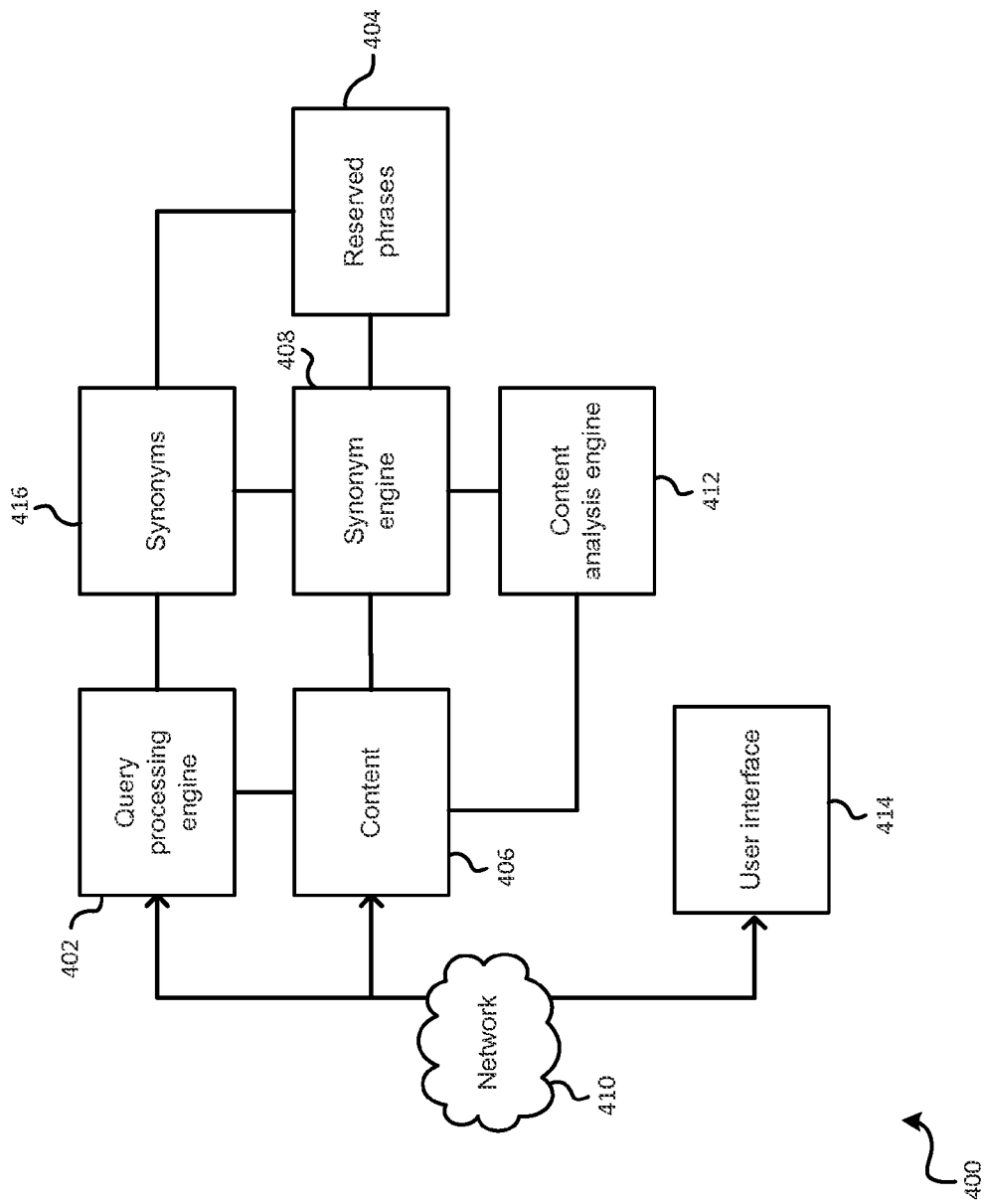
FIG. 4 is a block diagram illustrating elements of a contextual search system according to one embodiment of the present invention.

FIG. 4 is a block diagram illustrating elements of a contextual search system according to one embodiment of the present invention. The system 400 may be used to identify synonyms for a list of reserved phrases and/or use the synonyms and reserved phrases to process user queries. The system may include a content repository 406 which may include websites, documents, and/or other content. The content repository may be, for example, a product manufacturer's website. The system may include one or more lists of reserved phrases 404. The system may include one or more lists of synonyms 416 that are associated with the reserved phrases 404. The list of reserved phrases 404 and the synonyms 416 may be generated or related specifically to the content 406. In some cases a list of reserved phrases 404 may be received by the system from an external source or from a user. In some cases a content analysis engine 412 may be configured to scan or process the content 406 to identify reserved phrases. The system 400 may further include a synonym engine 408. The synonym engine may be configured to automatically generate synonyms for each one of the reserved phrases. Synonyms 416 for the reserved phrases 404 may be generated by the synonym engine 408 by taking unique substrings of the reserved phrases. In some embodiments, the synonym engine 408 may generate synonyms by analyzing related words in the content by utilizing the content analysis engine 412, analyzing external content, and/or monitoring user queries.

A user interface 414 may be used by a user to submit queries. Queries may be questions or searches related to the content 406. The goals of these searches should be to identify the topic of the query and to identify reserved phrases or synonyms present in the query. In one embodiment, the user interface 414 may be a webpage displayed in a web browser or an application displayed on a user's computer or mobile computing device. The user interface may include a text box or other input area for submitting searches or queries. Queries from the user interface 414 may be transmitted to the query processing engine 402. In the case where the user interface 414 is remote from the query processing engine 402, queries from the user interface 414 may be transmitted via a network 410. The query processing engine 402 may analyze the query, the context of the query, and identify if any of the words of the query match the reserved phrases 404 and synonyms 416. The query processing engine 402 may map query words that match synonyms 416 to the associated reserved phrases. The query processing engine may map the related reserved phrases to specific areas of the content 406. The related content or links to the related content may be returned and transmitted to the user interface 414.

In some embodiments, the query processing engine 402 may monitor and keep a record of user queries and if the user queries were successfully mapped into areas of the content 406. The query processing engine 402 may record how many times each of the unmatched words in a user query was entered. The history of queries and their successful mapping to the content 406 may be used to refine synonyms 416 and reserved phrases 404 used by the system.

Figure 5:
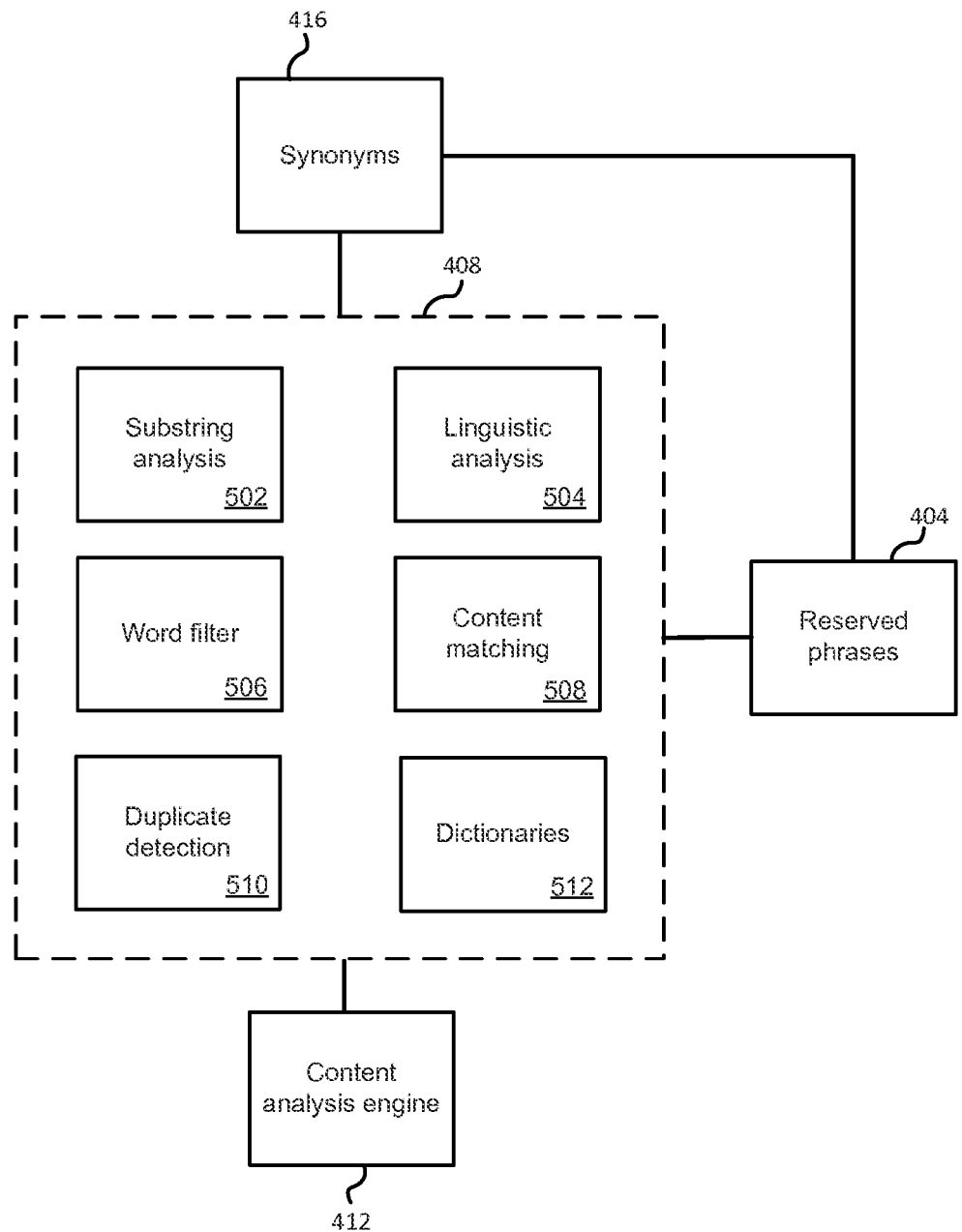
FIG. 5 is a block diagram illustrating additional details of elements of the synonym engine according to embodiments of the present invention.

FIG. 5 is a block diagram illustrating additional details of elements of the synonym engine according to embodiments of the present invention. The synonym engine 408 may be used to identify synonyms for a list of reserved phrases. The synonym engine 408 may include various modules for processing reserved phrases 404 and content to automatically generate a list of synonyms for the reserved phrases 404. The synonym engine may include a substring analysis module 502, a linguistic analysis module 504, a word filter 506, content matching module 508, a duplicate detection module 510, and various dictionaries 512. In embodiments the functionalities of the various modules may be combined or divided into a different number of modules and some embodiments of the synonym engine 408 include a subset of the functionalities described herein.

One or more lists of reserved phrases 404 may be received by the synonym engine 408. The lists of reserved phrases 404 may include groupings or linguistic designators. The grouping may include a designator such as if the reserved phrase is a noun, a place, a verb, and the like. When the designator is not available for the reserved phrases the linguistic analysis module 504 may be used to identify the linguistic properties of the reserved phrases. In some cases the linguistic properties, such as, for example, if the reserved phrase is a noun or a verb, may be determined directly from the reserved word. In some cases the reserved phrase in isolation may be too ambiguous. In some embodiments the linguistic analysis module 504 may request content from the content analysis engine 412 that includes the reserved phrases. The content analysis engine 412 may return complete sentences, paragraphs, or other parts of content that contain the reserved phrases. Based on the usage of the reserved phrases in the content, the linguistic analysis module 504 may determine linguistic properties of the reserved phrases. The linguistic analysis module 504 may determine if the reserved phrases are consistently used as nouns, verbs, or the like. The grouping and the linguistic properties of the reserved phrases may be associated with each reserved phrase and synonyms determined for each reserved word.

The substring analysis module 502 may be used to generate a list of possible substrings of each reserved word. The substring analysis module 502 may dissect the reserved phrases into various substrings for use as synonyms. In some cases the substring analysis module 502 may include a set of rules for generating substring synonyms. For example, the substring module may be limited to generating substrings that are at least three characters long. Additional rules may include that the substring start with the same letter as the reserved word. In another example of rules for generating substring synonyms, the module 502 may be configured to generate substring by removing numeric characters and leaving only letter characters.

The dictionaries 512, which may include thesauruses, dictionaries, and the like, may be used to determine additional synonyms for reserved phrases. The dictionaries 512 may be used to determine lists of related words and/or linguistic characteristics.

In some embodiments, a content matching module 508 may be used to determine synonyms for reserved phrases directly from the content. The content machine module 508 may analyze the content to identify words that are used interchangeably with the reserved phrases.

Lists of generated synonyms by the modules of the synonym engine 408 may be processed by a duplicate detection module 510. The duplicate detection module 510 may be configured to identify words that may have been identified as synonyms for more than one reserved word. The duplicate detection module 510 may identify duplicate synonyms and remove the duplicates. In some cases, the duplicate detection module 510 may identify duplicate synonyms and delete all but one duplicate. The pruning of duplicate entries may be based on the importance or ranking of the reserved phrases associated with each duplicate synonym. The duplicate synonym associated with the highest ranked reserved phrase may be left in the list of synonyms while all others removed.

In embodiments, a word filter module 506 may be used to further process the list of synonyms. The filter module 506 may compare the list of synonyms to a list of banned words and/or analyze the synonyms using rules. Synonyms that match any of the banned words may be filtered or removed by the filter module 506. Synonyms that match one or more rules may also be filtered or removed. Rules, for example, may include that the synonyms be at least three characters long, or that the synonyms start with the same letter as the reserved word.

Figure 6:
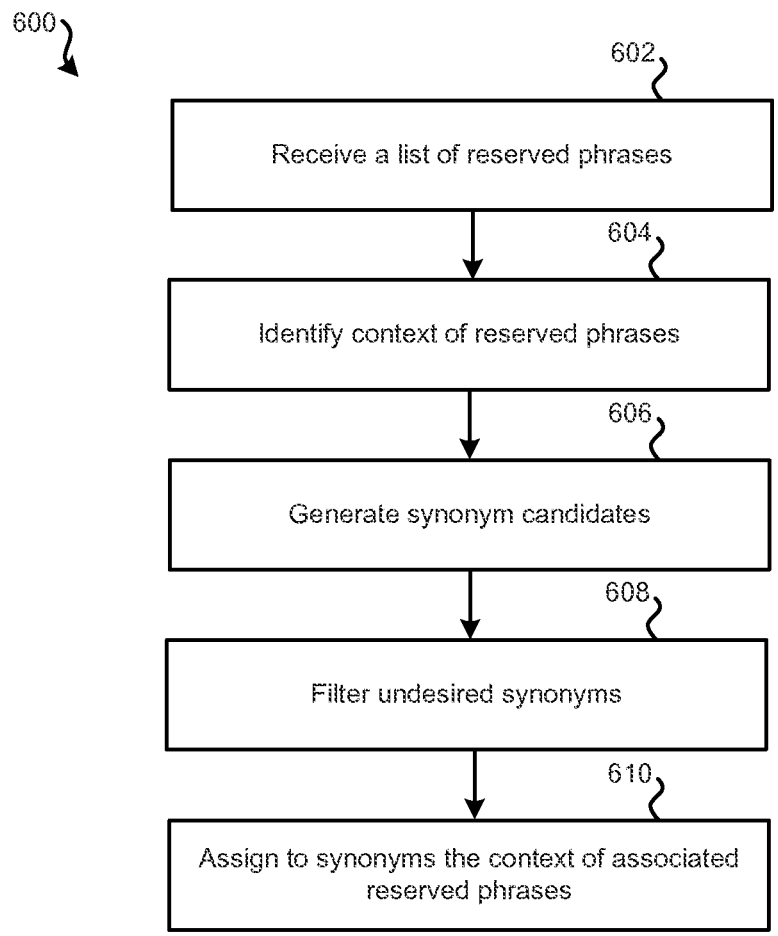
FIG. 6 is a flowchart illustrating a process for determining synonyms for reserved phrases according to one embodiment of the present invention.

FIG. 6 is a flowchart illustrating a process for determining synonyms for reserved phrases according to one embodiment of the present invention. Method 600 may be performed using the systems previously described. For instance, the synonym engine 500 of FIG. 5 or the system 700 of FIG. 7 may be used. Components of such systems may be implemented using hardware, software, and/or firmware.

At step 602 the system may receive one or more lists of reserved phrases. The reserved phrases may be received from a user or a different part of the system. The list of reserved phrases may include names or products or words that can be found in content such as a website. Reserved phrases may be associated or linked to specific parts of the content. At step 604 the context of the reserved phrases may be identified. The context may be determined from the reserved word. Dictionaries and other references may be used to determine linguistic characteristics of the reserved phrases. In some cases the content where there reserved phrases are used may be searched to identify the context of the reserved phrases. The sentences where the reserved phrases are used may be analyzed to determine their context which may include their linguistic characteristics, related topics, or the like.

Using, at least in part, the determined context of the reserved phrases, the system may determine synonyms for the reserved phrases at step 606. Synonyms may be determined via references materials, analyzing the content, substring analysis, and/or the like. At step 608 undesired synonyms may be filtered. Undesired synonyms may include duplicate synonyms that are associated with more than one reserved word, competitor product names, and/or the like. At step 610 the left over synonyms may inherit the context of the associated reserved phrases.

Figure 7:
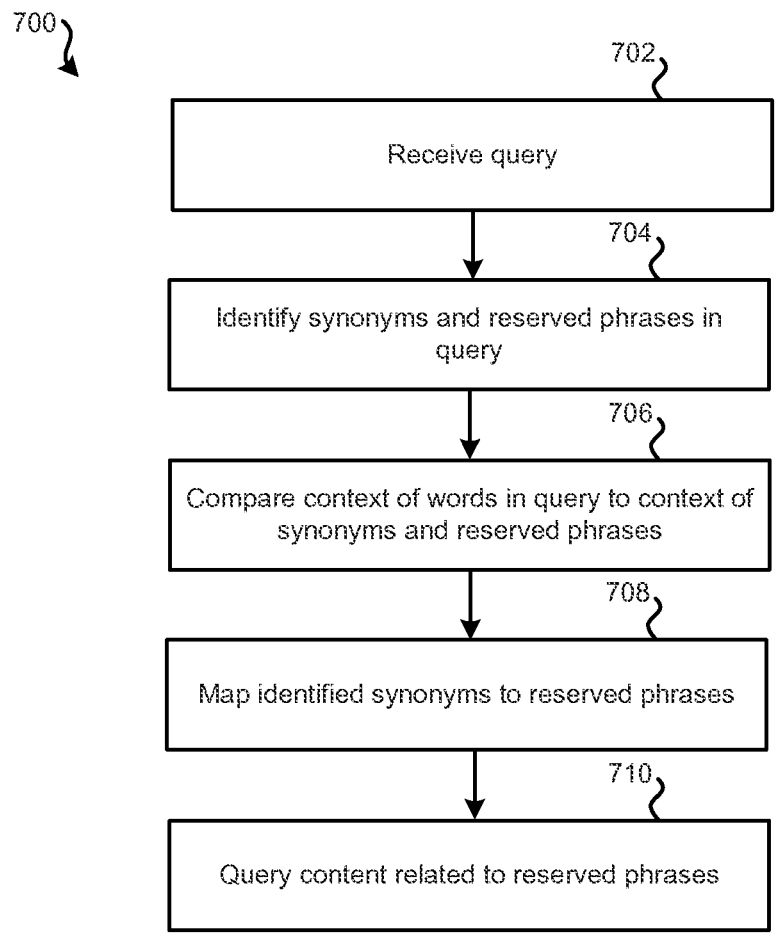
FIG. 7 is a flowchart illustrating additional details of processing of a user query using reserved phrases and their synonyms according to one embodiment of the present invention.

FIG. 7 is a flowchart illustrating additional details of processing of a user query using reserved phrases and their synonyms according to one embodiment of the present invention. Method 700 may be performed using the systems previously described. For instance, the synonym engine 500 of FIG. 5 or the system 400 of FIG. 4 may be used. Components of such systems may be implemented using hardware, software, and/or firmware.

At step 702 a query string may be received. The query may be received from a user via a user interface and transmitted to the query system via a network. In some cases, the query may be received from a different part of the system or a different system. At step 704 the query string may be analyzed and processed to identify if any reserved phrases or synonyms of the reserved phrases are part of the query string. At step 706 the location and context of the identified synonyms and/or reserved phrases may be identified. Based at least in part on the location in the query string, the structure of the query string, and the like the characteristics, such as linguistic characteristics of the matching words in the query string may be determined by the system. The context of the words in the query string may be compared with the context of the reserved phrases and synonyms to determine if they match. If the context matches, the synonyms and/or reserved phrases of the query string may be considered a match. If the query string includes matching synonyms, the synonyms may be mapped to the associated reserved phrases in step 708. At step 710 the mapped reserved phrases may be used to process the query string. Reserved phrases may be associated with specific parts of content or links to content. The content or links to the content associated with the reserved phrases that were identified in the query string may be returned to the user.

Figure 8:
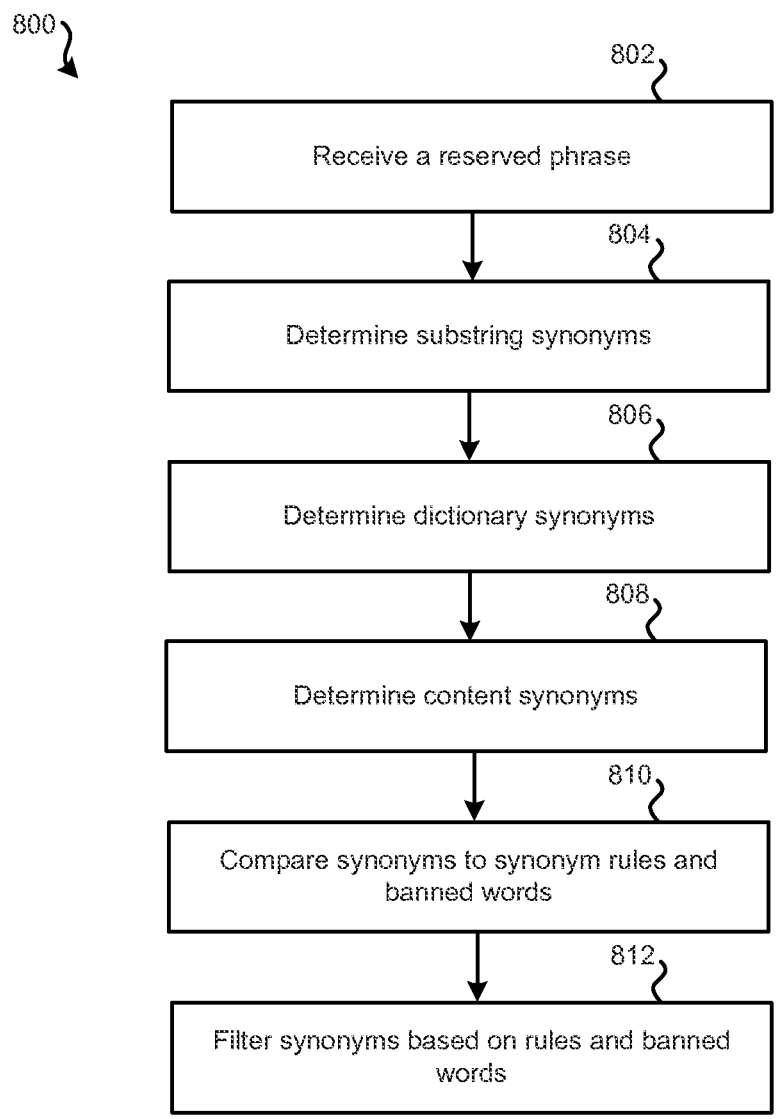
FIG. 8 is a flowchart illustrating a process for determining synonyms for reserved phrases according to one embodiment of the present invention.

FIG. 8 is a flowchart illustrating a process for determining synonyms for reserved phrases according to one embodiment of the present invention. Method 800 may be performed using the systems previously described. For instance, the synonym engine 500 of FIG. 5 or the system 400 of FIG. 4 may be used. Components of such systems may be implemented using hardware, software, and/or firmware.

At step 802 a reserved phrase may be received. The reserved phrase may be processed using one or more step to generate synonyms for the reserved word. In some embodiments, the reserved phrase may be processed at step 804 to identify substrings of the reserved phrases as potential synonyms. Substring generation may include rules such as minimum and/or maximum number of characters. In some cases substrings may include additional endings that are not part of the original reserved word. Substrings with alternate endings, suffixes, and/or prefixes may be generated as used as potential synonyms. Suffixes such as for example, "ed" or "ing" may be appropriate for some reserved phrases.

In some embodiments, the reserved phrase may be processed at step 806 using dictionaries, thesauruses, and the like to identify common or well-known synonyms for the reserved word. In some embodiments, the reserved phrase may be processed at step 808 using the target content. The text of the content may be analyzed to determine words that are used interchangeably with the reserved word. The interchangeable words may be marked as potential candidates for synonyms of the reserved word. At step 810 the identified synonyms may be further processed and compared against synonym rules and/or a list of banned words. Synonym rules may include rules that specify the minimum or maximum number of characters of the synonym, number of non-letter characters, and the like. Any synonyms that do not match the rules or are part of the list of banned words may be filtered at step 812.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for search string expansion, the method comprising:
    receiving a list of reserved phrases, each reserved phrase in the list being related to a content and wherein each reserved phrase is associated with a portion of the content;
    categorizing each reserved phrase according to linguistic characteristics;
    generating a candidate list of synonyms for each reserved phrase in the list;
    filtering the candidate list of synonyms by:
        removing synonym duplicates; and
        comparing synonyms to a synonym rule and removing synonyms that do not comply with the synonym rule;
    categorizing each synonym in the filtered candidate list of synonyms according to linguistic characteristics of the associated reserved phrase;
    receiving a query string;
    identifying a matching synonym from the filtered list of candidate synonyms that matches a part of the query string; and
    determining if the part of the query string matches the linguistic characteristics of the matching synonym.

2. The method from claim 1, further comprising:
    transmitting the portion of the content associated with the reserved phrase of the matching synonym.

3. The method of claim 1, wherein generating a candidate list of synonyms comprises:
    generating a list of substring variations of each of the reserved phrases.

4. The method of claim 1, wherein generating a candidate list of synonyms comprises:
    analyzing the content; and
    determining alternate words used to refer to each of the reserved phrases in the content.

5. The method of claim 1, wherein linguistic characteristics include at least one of a noun, a verb, or a place.

6. A system comprising:
    a processor; and
    a memory coupled with and readable by the processor and storing therein a set of instructions which, when executed by the processor, causes the processor to perform a search string expansion by:
        receiving a list of reserved phrases, each reserved phrase in the list being related to a content and wherein each reserved phrase is associated with a portion of the content;
        categorizing each reserved phrase according to linguistic characteristics;
        generating a candidate list of synonyms for each reserved phrase in the list;
        filtering the candidate list of synonyms by:
            removing synonym duplicates; and
            comparing synonyms to a synonym rule and removing synonyms that do not comply with the synonym rule;
        categorizing each synonym in the filtered candidate list of synonyms according to linguistic characteristics of the associated reserved phrase;
        receiving a query string;
        identifying a matching synonym from the filtered list of candidate synonyms that matches a part of the query string; and
        determining if the part of the query string matches the linguistic characteristics of the matching synonym.

7. The system from claim 6, further comprising:
    transmitting the portion of the content associated with the reserved phrase of the matching synonym.

8. The system of claim 6, wherein generating a candidate list of synonyms comprises:
    generating a list of substring variations of each of the reserved phrases.

9. The system of claim 6, wherein generating a candidate list of synonyms comprises:
    analyzing the content; and
    determining alternate words used to refer to each of the reserved phrases in the content.

10. The system of claim 6, wherein linguistic characteristics include at least one of a noun, a verb, or a place.

11. A computer-readable memory comprising a set of instructions stored therein which, when executed by a processor, causes the processor to perform a search string expansion by:
    receiving a list of reserved phrases, each reserved phrase in the list being related to a content and wherein each reserved phrase is associated with a portion of the content;
    categorizing each reserved phrase according to linguistic characteristics;
    generating a candidate list of synonyms for each reserved phrase in the list;
    filtering the candidate list of synonyms by:
        removing synonym duplicates; and
        comparing synonyms to a synonym rule and removing synonyms that do not comply with the synonym rule;
    categorizing each synonym in the filtered candidate list of synonyms according to linguistic characteristics of the associated reserved phrase;
    receiving a query string;
    identifying a matching synonym from the filtered list of candidate synonyms that matches a part of the query string; and
    determining if the part of the query string matches the linguistic characteristics of the matching synonym.

12. The computer-readable memory from claim 11, further comprising:
    transmitting the portion of the content associated with the reserved phrase of the matching synonym.

13. The computer-readable memory of claim 11, wherein generating a candidate list of synonyms comprises:
    generating a list of substring variations of each of the reserved phrases.

14. The computer-readable memory of claim 11, wherein generating a candidate list of synonyms comprises:
    analyzing the content; and
    determining alternate words used to refer to each of the reserved phrases in the content.

15. The computer-readable memory of claim 11, wherein linguistic characteristics include at least one of a noun, a verb, or a place.

\* \* \* \* \*

UNITED STATES PATENT AND TRADEMARK OFFICE
CERTIFICATE OF CORRECTION

PATENT NO. : 9,690,851 B2
APPLICATION NO. : 14/548553
DATED : June 27, 2017
INVENTOR(S) : Nauze et al.

It is certified that error appears in the above-identified patent and that said Letters Patent is hereby corrected as shown below:

In Column 1, Line 34, after "ambiguity" insert -- . --.

In Column 3, Lines 62-63, delete "ComputecX"" and insert -- Computec X" --, therefor.

Signed and Sealed this
First Day of May, 2018

Andrei Iancu
*Director of the United States Patent and Trademark Office*